(12) United States Patent
Roberge (10) Patent No.: US 10,989,117 B2
(45) Date of Patent: Apr. 27, 2021

(54) HYBRID EXPANDER CYCLE WITH PRE-COMPRESSION COOLING AND TURBO-GENERATOR

(71) Applicant: United Technologies Corporation, Farmington, CT (US)

(72) Inventor: Gary D. Roberge, Tolland, CT (US)

(73) Assignee: Raytheon Technologies Corporation, Farmington, CT (US)

(*) Notice: Subject to any disclaimer, the term of this patent is extended or adjusted under 35 U.S.C. 154(b) by 127 days.

(21) Appl. No.: 16/131,712

(22) Filed: Sep. 14, 2018

(65) Prior Publication Data
US 2020/0088098 A1   Mar. 19, 2020

(51) Int. Cl.
| F02C 7/143 | (2006.01) |
| F02C 3/22  | (2006.01) |
| F02C 7/224 | (2006.01) |
| F02C 9/40  | (2006.01) |

(52) U.S. Cl.
CPC .............. *F02C 7/143* (2013.01); *F02C 3/22* (2013.01); *F02C 7/224* (2013.01); *F02C 9/40* (2013.01)

(58) Field of Classification Search
CPC .... F02C 3/22; F02C 7/12; F02C 7/143; F02C 7/16; F02C 7/18; F02C 7/224; F02C 9/40; F05D 2260/211
See application file for complete search history.

(56) References Cited

U.S. PATENT DOCUMENTS

| 5,101,622 A | 4/1992 | Bond |
| 5,161,365 A * | 11/1992 | Wright .............. F02C 7/32 |
| | | 60/780 |
| 5,410,874 A | 5/1995 | Limerick |
| 5,626,019 A | 5/1997 | Shimizu et al. |
| 6,202,404 B1 | 3/2001 | Balepin |
| 7,028,481 B1 | 4/2006 | Morrow |
| 9,739,199 B2 | 8/2017 | Kessler et al. |
| 2007/0089423 A1 | 4/2007 | Norman et al. |
| 2012/0096869 A1 | 4/2012 | Kesseli et al. |
| 2013/0186059 A1* | 7/2013 | Epstein .................. F02C 7/224 |
| | | 60/205 |

(Continued)

FOREIGN PATENT DOCUMENTS

| GB | 2240813 A | 8/1991 |
| GB | 2531775 A | 5/2016 |
| WO | WO2012/045034 A2 | 4/2012 |

OTHER PUBLICATIONS

Extended European Search Report for EP Application No. 19197611.7, dated Jan. 29, 2020, 6 pages.

*Primary Examiner* — Scott J Walthour
(74) *Attorney, Agent, or Firm* — Kinney & Lange, P.A.

(57) ABSTRACT

A gas turbine engine system includes a gas turbine engine and a fuel turbine system. The gas turbine engine includes an air inlet, compressor, combustor, turbine, and heat exchange system. The heat exchange system is configured to transfer thermal energy from an inlet air flow or exhaust air flow to a fuel to produce a gaseous fuel that is used to drive a fuel turbine and fuel pump and used for combustion in the gas turbine engine. The fuel turbine is in fluid communication with the heat exchange system and the combustor and configured to extract energy from expansion of the gaseous fuel. The fuel pump is configured to be driven by the fuel turbine and is in fluid communication with the heat exchanger system.

20 Claims, 3 Drawing Sheets

(56) References Cited

U.S. PATENT DOCUMENTS

| | | |
|---|---|---|
| 2014/0182264 A1 | 7/2014 | Weisgerber et al. |
| 2016/0105078 A1* | 4/2016 | Santini .................... F16H 47/02 290/52 |
| 2020/0088102 A1* | 3/2020 | Roberge ................. F02C 7/224 |

* cited by examiner

HYBRID EXPANDER CYCLE WITH PRE-COMPRESSION COOLING AND TURBO-GENERATOR

BACKGROUND

The present disclosure relates generally to a gas turbine engine of an aircraft and, more specifically to a gas turbine engine using non-traditional cooled liquid fuel with pre-compression inlet air cooling and a turbo-generator.

Aircraft engines are being simultaneously challenged to provide increases in thermal efficiency, electrical power generation, and thermal management while reducing environmental emissions. Shaft power extraction impacts sizing of turbomachinery components and can have an adverse impact on performance and operability. Thermal management (e.g, providing a heat sink for engine and external systems) is limited by engine internal temperatures and can result in excessive pressure losses as heat is rejected using heat exchangers or other devices. Use of existing hydrocarbon fuel as a heat sink is limited to fuel temperature typically under 450° F. due to coking and decomposition of fuels at high temperatures. Thermal efficiency improvement trends typically involve providing a higher overall pressure ratio (OPR) of the compression system with associated increases in compressor discharge pressure (P3) and accompanying temperature (T3). The OPR is increased by increasing a compressor discharge pressure (P3). As pressure increases across the compressor, temperature also increases. Current aircraft designs are generally limited by operational temperature limits of materials used for gas turbine structures. As aircraft speeds increase, inlet temperatures (T2) increase, which poses a challenge for providing improvements in thermal efficiency as T2 greatly impacts T3 and thereby the achievable OPR. For example, for a MIL-E-5007D inlet recovery, the temperature (T2) entering into the engine at subsonic cruise of Mach 0.8 at 45,000 feet is −20° F. (−29° C.), while the inlet temperature at the same altitude at Mach 3.0 is in excess of 630° F. (332° C.). This increased temperature greatly impacts the ability to operate at a high OPR due to limitations in material capability at high temperature. In addition, the relationship between T2, OPR, and T3 may result in the formation of harmful emissions including nitrogen oxides ($NO_x$), which can be produced in the compression cycle of the engine with production compounded in subsequent combustion and turbine operations. This will be of particular concern for potential future commercial supersonic transport or business jet aircraft flying at higher altitudes (i.e., greater than 60,000 feet) where NOx emissions can have an increased environmental impact. While emission reductions in NOx, as well as carbon monoxide and particulates is desirable, it often runs counter to desired cycle characteristics and can be difficult to achieve with current hydrocarbon fuels. New engine concepts that could fundamentally alter the impact of these trends are desired.

SUMMARY

In one aspect, a gas turbine engine system includes a gas turbine engine and a fuel turbine system. The gas turbine engine includes an air inlet, compressor, combustor, turbine, and heat exchange system. The heat exchange system is configured to transfer thermal energy from an inlet air flow or exhaust air flow to a fuel to produce a gaseous fuel that is used to drive a fuel turbine and fuel pump and used for combustion in the gas turbine engine. The fuel turbine is in fluid communication with the heat exchange system and the combustor and configured to extract energy from expansion of the gaseous fuel. The fuel pump is configured to be driven by the fuel turbine and is in fluid communication with the heat exchanger system.

In another aspect, a method of operating a gas turbine engine system includes cooling an inlet air flow via an inlet heat exchange system by transferring thermal energy to a liquid fuel to produce a cooled inlet air flow. The cooled inlet air flow is compressed to produce a compressed air for combustion. Energy is extracted from expansion of a gaseous fuel through a multi-stage fuel turbine, which produces a gaseous fuel having a pressure greater than a pressure of the compressed air flow. The fuel turbine is fluidly connected to the inlet heat exchange system. A mixture of the gaseous fuel from an outlet of the fuel turbine and compressed air flow is combusted. A pump driven by the fuel turbine pumps liquid fuel to the inlet heat exchange system.

In yet another aspect, a fuel turbine system includes a heat exchange system configured to transfer heat to a liquid fuel to produce a gaseous fuel, a fuel turbine in fluid communication with the heat exchange system and configured to extract energy from expansion of the gaseous fuel, and a fuel pump in fluid communication with the heat exchange system and configured to deliver the liquid fuel to the heat exchange system. The fuel pump is mechanically coupled to the fuel turbine and configured to be driven by the fuel turbine.

The present summary is provided only by way of example, and not limitation. Other aspects of the present disclosure will be appreciated in view of the entirety of the present disclosure, including the entire text, claims, and accompanying figures.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

The present disclosure combines the use of a non-traditional fuel, such as methane or hydrogen, stored in a cooled liquid state, to drive a hybrid cycle of a gas turbine engine system—the hybrid cycle consisting of a conventional Brayton cycle with pre-compression inlet air cooling and an expander cycle, which utilizes waste heat added to the fuel to drive a turbo-generator. The disclosed embodiments are directed to an augmented military-style gas turbine engine with a low bypass ratio, however, could be adapted for use in a high speed commercial aircraft engine with or without thrust augmentation. In the cooled liquid state, the fuel provides a heat sink for high temperature inlet air. The liquid fuel can be further heated by exhaust gas waste heat of the gas turbine engine to form a high-pressure gaseous fuel, which is used to drive a multi-stage fuel turbine, liquid fuel pump, and motor/generator. Fuel expanded through the multi-stage fuel turbine is then used in the gas turbine engine for combustion.

The disclosed system can use plentiful and cleaner burning fuel as compared to current hydrocarbon fuels to allow engine cycle and OPR/thermal efficiency gains to be established independent of vehicle speed and inlet compression characteristic (i.e., temperature) while enabling high speed engine design using existing materials. Additionally, electrical generation using regenerative (i.e., waste heat) input can be provided with reduced impact on turbomachinery sizing, performance, and operability. Additional benefits may also be realized with new combustor concepts enabled by the disclosed system, including reduced combustion length, staged combustion, and reduced emissions. The disclosed system could also be used to reduce augmenter length for applications where increased specific thrust is required.

Figure 1:
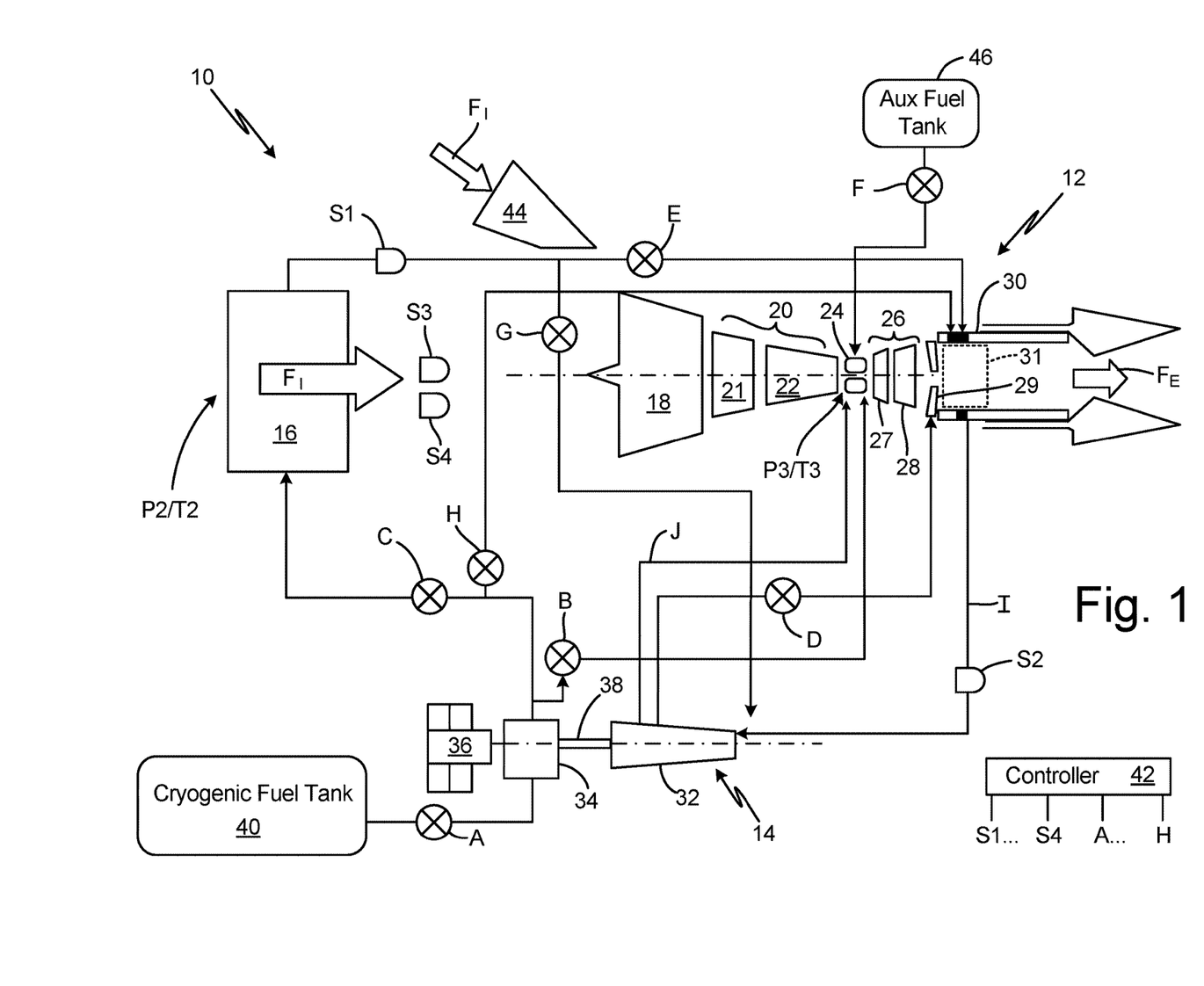
FIG. 1 is a schematic diagram of one embodiment of a gas turbine engine system with pre-compression cooling and a turbo-generator with an expander cycle.

FIG. 1 is a schematic diagram of one embodiment of gas turbine engine system 10 with pre-compression cooling and expander cycle. System 10 includes gas turbine engine 12 and turbo-generator 14. Gas turbine engine 12 includes inlet heat exchanger 16, fan section 18, compressor section 20 (including low pressure compressor (LPC) 21 and high pressure compressor (HPC) 22), combustor section 24, turbine section 26 (including high pressure turbine (HPT) 27 and low pressure turbine (LPT) 28), optional augmentor 29, and optional exhaust heat exchanger 30. Fan section 18 drives inlet air flow $F_I$. Compressor section 20 draws air in along a core flow path where air is compressed and communicated to combustor section 24. In combustor section 24, air is mixed with fuel and ignited to generate a high-pressure combustion exhaust gas stream that expands through turbine section 26 where energy is extracted and utilized to drive fan section 18 and compressor section 20.

Although the disclosed non-limiting embodiment depicts a turbofan gas turbine engine, it should be understood that the concepts described herein are not limited to use with turbofans as the teachings may be applied to other types of turbine engines, including, for example, a turbine engine including a three-spool architecture. While the present disclosure focuses on utilization of a twin spool, axial flow gas turbine fan-jet military-style engine, it will be appreciated that it has utility in other types of engines, such as turbojets and engines used in nonmilitary, high speed applications (e.g., commercial supersonic transport).

Turbo-generator includes fuel turbine 32, fuel pump 34, and motor/generator 36. Fuel turbine 32 is a multi-stage turbine with multiple stages of turbine blades driven by the expansion of high-pressure gaseous fuel. Fuel turbine 32, fuel pump 34, and motor/generator 36 are coupled to rotor shaft 38 such that fuel pump 34 and motor/generator 36 are mechanically driven by the rotation of fuel turbine 32. Fuel pump 34 is configured to deliver fuel through system 10. Motor/generator 36 can be configured to supply power for system 10 components and/or other engine systems and power needs.

System 10 additionally includes fuel tank 40 configured to contain a cryogenic fuel and a series of conduits configured to deliver the fuel in liquid and/or gaseous phase via fuel pump 34 through system 10. A plurality of valved fuel lines A-H can be used to deliver and control the flow of fuel through system 10 via controller 42. Controller 42 can be operatively coupled (e.g., electrically and/or communicatively) to components shown in FIG. 1 as well as components not depicted (e.g., additional valves, sensors, etc.) to control operation of system 10. Controller 42 can be configured to receive, transmit, and/or process sensor data and/or signals for the operation of system 10. Controller 42 can include a processor, such as a microprocessor, programmable logic controller, or the like.

Additionally, system 10 can include a plurality of temperature and/or pressure sensors S1-S3 configured to detect a temperature and/or pressure of the fuel at various locations in system 10 or air flow through gas turbine engine 12. As shown in FIG. 1, sensors S1 and S2 detect a temperature and/or pressure of fuel in fuel lines E/G and J, while sensor S3 detects a temperature and/or pressure (T2/P2) of air entering fan 18. In some embodiments, sensor S4 can be used to detect leakage of fuel from inlet heat exchanger 16. In some embodiments, system 10 can also include auxiliary fuel tank 46, configured to deliver an auxiliary supply of gaseous fuel to combustor 24.

System 10 is configured for use with gas turbine engines operating at high speed (i.e., supersonic speeds typically greater than Mach 2) with inlet air temperatures generally exceeding 250° F. (121° C.). System 10 can be used to improve thermal efficiency of gas turbine engine 12 by reducing inlet temperatures T2 and thereby allowing an increased level of overall pressure ratio (OPR) for a given T3 limit. The OPR is increased by increasing the compressor outlet pressure P3. As pressure increases across compressor section 20, temperature also increases. Current aircraft engine designs are generally limited by material capability and compressor outlet temperature T3 limits. As aircraft speeds increase, inlet temperatures T2 increase, which poses a challenge for providing improvements in thermal efficiency as T2 greatly impacts T3 and thereby the achievable OPR. This increased temperature greatly impacts the ability to operate at a high OPR due to limitations in material capability at high temperature. System 10 allows OPR/thermal efficiency gains to be established independent of vehicle speed and inlet air temperature T2.

In addition to improving thermal efficiency of gas turbine engine 12, system 10 can be configured to reduce combustion related emissions as compared to engines that burn traditionally used fossil fuels, and to generate power for operating components of system 10, including fuel pump 34, as well as other engine systems from heat supplied by inlet air flow and/or exhaust gas from gas turbine engine 12.

As illustrated in FIG. 1, a cryogenic liquid fuel is stored in fuel tank 40 at low temperature and pressure. Suitable fuels can include, but are not limited to, liquefied methane (i.e., liquefied natural gas (LNG)) and liquid hydrogen. Tank 40 can be configured in any manner and made of any material suitable for storing cryogenic fuels as known in the art. The temperature of the fuel is sufficiently low to provide inlet air cooling, but can vary significantly depending on system 10 configuration, inlet heat exchanger 16 configuration, and inlet air temperature T2. For example, inlet air temperature T2 at Mach 3 can be greater than 630° F. (332° C.). Generally, it will be desired to reduce the inlet air temperature T2 to 250° F. (121° C.) or less. In one non-limiting example, liquid hydrogen fuel stored at −425° F. (−254° C.) and 25 psi (172 kPa) can be used effectively for inlet air cooling at Mach 3 operating conditions. As will be understood, fuel temperature can be varied considerably from the example provided depending on system configurations and operational conditions (e.g., lower fuel temperatures may be used as speeds approach or exceed Mach 5).

Fuel pump 34 is configured to pump liquid fuel from tank 40 through fuel lines A and C to inlet heat exchanger 16. Fuel pump 34 increases the pressure of liquid fuel entering inlet heat exchanger 16. In some non-limiting embodiments, the pressure of fuel entering inlet heat exchanger 16 from fuel pump 34 can be in excess of 550 psi (3,792 kPa). It will be understood by one of ordinary skill in the art to design pump 34 and the fuel circuit of system 10 (i.e., fuel lines A-J) to provide effective circulation of the fuel through system 10. Liquid fuel can be pumped to inlet heat exchanger 16 when inlet air cooling is needed. Generally, inlet heat exchanger 16 is needed only during high speed flight when inlet air temperatures exceed 250° F. (121° C.) and generally is not needed during takeoff and subsonic flight or when temperatures are below 250° F. (121° C.). Valve C can be used to control fuel flow into inlet heat exchanger 16 based on aircraft operation. Inlet heat exchanger 16 is positioned in a primary inlet of gas turbine engine 12 and configured to substantially cover the primary inlet to provide cooling to a substantial portion of inlet air while also allowing passage of inlet air. Inlet heat exchanger 16 can be a plate-fin, shell-and-tube, or other suitable air-to-liquid heat exchanger as known in the art. To substantially cover the primary inlet to gas turbine engine 12, inlet heat exchanger 16 can have a web-like or grid-like configuration with a network of cooling channels extending radially, crosswise, and/or in concentric rings over the primary inlet to provide cooling to a substantial portion of inlet air entering gas turbine engine 12.

A pressure drop can occur across inlet heat exchanger 16. This drop in pressure can be avoided or mitigated when inlet heat exchanger 16 is not in use through use of auxiliary inlet 44. Auxiliary inlet 44 can be used to partially bypass the primary inlet and inlet heat exchanger 16. Auxiliary inlet 44 can include one or more openings arranged around a circumference of a nacelle of gas turbine engine 12. Inlet air entering gas turbine engine 12 through auxiliary inlet 44 will be at a higher pressure than inlet air entering gas turbine engine 12 from inlet heat exchanger 16, which causes air to be drawn preferentially through auxiliary inlet 44. Auxiliary inlet 44 can be closed when inlet heat exchanger 16 is in use.

Inlet heat exchanger 16 is configured to place inlet air flow $F_I$ and liquid fuel in thermal communication such that thermal energy from the inlet air is transferred to the liquid fuel. The temperature of fuel exiting inlet heat exchanger 16 can vary depending on the temperature of the fuel and inlet air entering inlet heat exchanger 16. Depending on the conditions, the fuel may remain in a liquid state or may vaporize when heated by inlet air. In some embodiments, gaseous fuel exiting inlet heat exchanger 16 can be directed through fuel line G directly to turbo-generator 14 to drive fuel turbine 32. For example, inlet air temperature for an aircraft operating at Mach 4.5 to 5 may be sufficiently high to produce a gaseous fuel capable of driving fuel turbine 32. In other instances, additional heat may be required to fully utilize the cooling and/or work extraction potential of the heated fuel. If additional heat is required, fuel exiting inlet heat exchanger 16 can be pumped through fuel line F to exhaust heat exchanger 30 where heat from exhaust gas exiting gas turbine engine 12 can be transferred to the fuel. Temperature and/or pressure sensor S1 can be used determine whether fuel exiting inlet heat exchanger 16 has a sufficient temperature and/or pressure to drive fuel turbine 32. Valves E and G can be opened or closed, accordingly, to direct fuel to exhaust heat exchanger 30 or fuel turbine 32, respectively.

Exhaust heat exchanger 30 can be a plate-fin, shell-and-tube, or other suitable air-to-liquid heat exchanger as known in the art. In some embodiments, exhaust heat exchanger 30 can be disposed in an exhaust case wall of gas turbine engine 12 and heat can be transferred through a wall to fuel circulating in tubing coiled or otherwise distributed around the exhaust case. In other embodiments, exhaust heat exchanger 30 can be located in a flow path of the exhaust gas $F_E$, as shown in phantom in FIG. 1. Exhaust heat exchanger 30 is configured to heat fuel from inlet heat exchanger 16 with waste heat from the exhaust gas of gas turbine engine 12. During some operations exhaust gas can have a temperature greater than 1500° F. (816° C.). When augmentor 29 is in use, exhaust gas temperatures can exceed 3200° F. (1760° C.). In a non-limiting example, fuel exiting exhaust heat exchanger 30 and entering fuel turbine 32 can have a temperature of about 1300° F. (704° C.) and pressure of about 515 psi (3,551 kPa). The temperature and pressure of fuel exiting exhaust heat exchanger 30 can be detected by sensor S2 positioned in fuel line J.

Fuel directed to turbo-generator 14 through fuel lines G or I expands through multi-stage fuel turbine 32, driving rotation of fuel turbine 32 and thereby fuel pump 34 and motor/generator 36, which can be located on common shaft 38 or otherwise mechanically coupled. Gaseous fuel exiting fuel turbine 32 can be supplied to combustor 24 through fuel line J and supplied to augmentor 29 through fuel line D. Combustor 24 is the primary burner for gas turbine engine 12. Augmentor 29 adds additional thrust to the engine by burning fuel in a secondary combustor section. Fuel turbine 32 is configured to maximize turbine work extraction, while providing a fuel pressure sufficient to overcome an operating pressure P3. As such, the pressure of gaseous fuel exiting fuel turbine 32 must be greater than the pressure P3 of compressed air entering combustor. Fuel turbine 32 can be sized to deliver the gaseous fuel at a pressure greater than P3. In some embodiments, fuel turbine 32 can include a discharge outlet 50 to enable discharge of fuel at a higher pressure than complete turbine discharge would provide as one element of a control mechanism to ensure the pressure of fuel delivered to combustor 24 exceeds P3. Combustor 24 and augmentor 29 include suitable fuel injectors for delivering gaseous fuel. Controller 42 can be used to regulate the amount of fuel delivered to combustor 24 and augmentor 29 to maintain optimum operation. The fuel pressure required for augmentor 29 is much lower than P3 (e.g., may be only be 20% of P3) and, therefore, may be extracted from a final outlet of fuel turbine 32 (i.e., after a final turbine stage).

Fuel turbine 32 drives fuel pump 34 and motor/generator 36, which are mechanically coupled to fuel turbine shaft 38. Fuel pump 34 produces a continuous cycling of fuel through system 10. Motor/generator 36 can be used to provide power to engine systems and components, including components of system 10. In some embodiments, motor/generator 36 can be used to drive fuel pump 34 when fuel turbine 32 is not in operation. In addition, power extracted or input from motor generator 36 can be varied as one element of a control architecture used to ensure fuel discharge pressure from fuel turbine 32 is adequate to overcome P3.

Fuel can be routed through varying fuel lines depending on the mode of operation (e.g., startup and in flight) and operating conditions. As previously disclosed, fuel can bypass inlet heat exchanger 16 during climb and low speed operations when inlet air temperatures are sufficiently low enough to not require inlet air cooling. During high speed operations in which inlet temperatures are high enough to produce a gaseous fuel suitable for driving fuel turbine 32, fuel exiting inlet heat exchanger 16 can bypass exhaust heat exchanger 30 via fuel line G to be routed directly to fuel turbine 32. During engine startup, liquid fuel can be supplied directly to combustor 24 through fuel line I. During startup, no fuel is routed through inlet or exhaust heat exchangers 16, 30 and, therefore, fuel turbine 32 is not in operation. In this instance, fuel pump 32 can be driven by motor/generator 36 or an alternative power source (not shown). In an alternative embodiment, an auxiliary fuel tank 46 can supply fuel to combustor through fuel line F during startup. Fuel stored in auxiliary fuel tank 46 can be the same as fuel stored in primary fuel tank 40 in a liquid or pressurized gaseous state. Fuel line H can be provided as a safety mechanism in the event of fuel leakage from inlet heat exchanger 16. Sensor S4 can be used to detect leakage of fuel from inlet heat exchanger 16 and signal controller 42 to close valved fuel line C and open bypass fuel line H to redirect fuel to exhaust heat exchanger 30. Exhaust heat exchanger 30 transfers waste heat from exhaust gas to the fuel to vaporize fuel as necessary to drive turbo-generator 14. From exhaust heat exchanger 30, the gaseous fuel is delivered to fuel turbine 32 via fuel line J.

Figure 2:
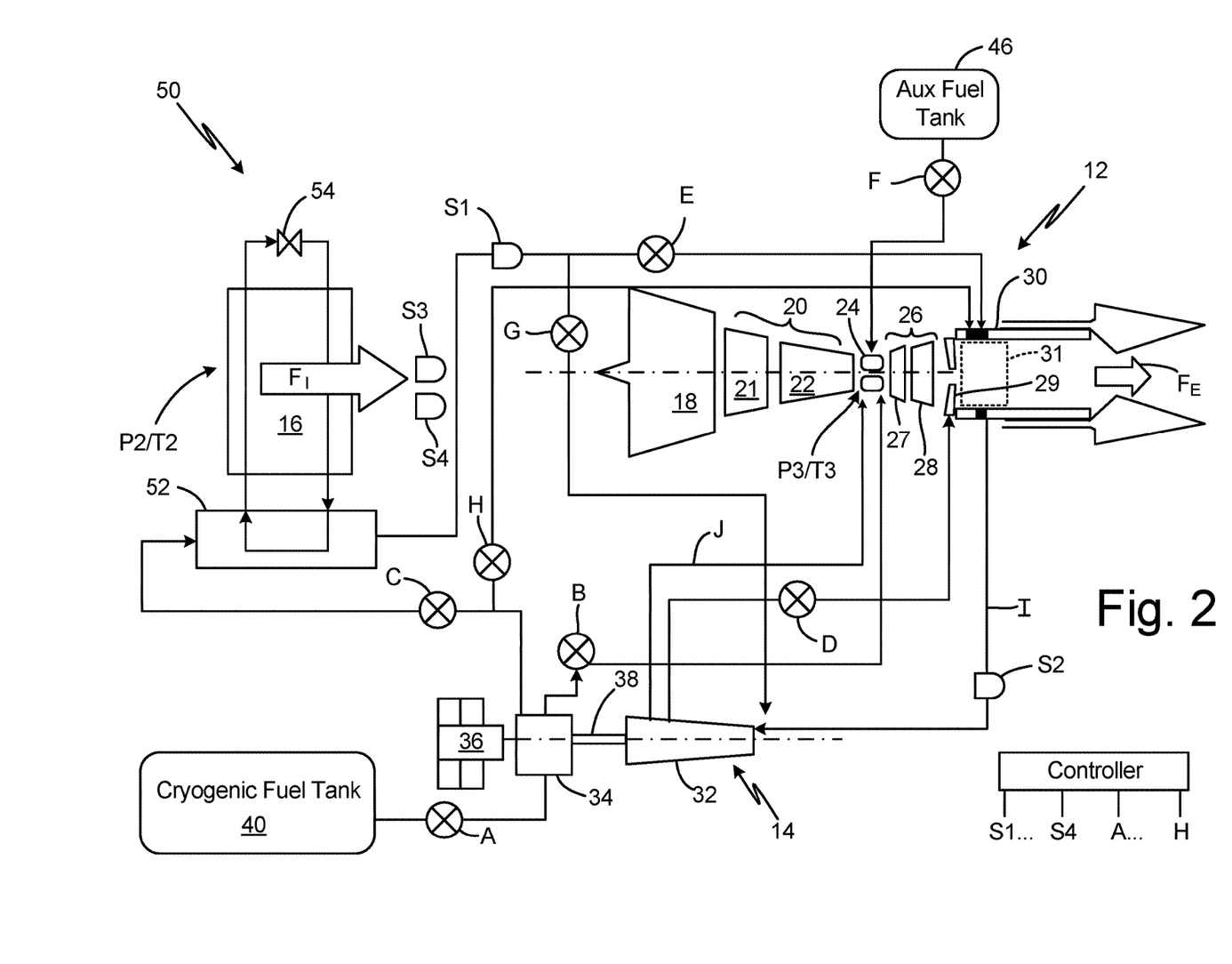
FIG. 2 is a schematic diagram of another embodiment a gas turbine engine system with pre-compression cooling and a turbo-generator with an expander cycle.

In alternative embodiments, an intermediate heat exchanger can be used to avoid bypassing inlet heat exchanger 16 in the event of fuel leakage. FIG. 2 is a schematic diagram of gas turbine engine system 50 with intermediate inlet heat exchanger 52. Intermediate inlet heat exchanger 52 can be located external to gas turbine engine 12 or outside of a core air flow to prevent fuel leakage into the core of gas turbine engine 12. As illustrated in FIG. 2, fuel can be used to cool a separate inert (non-combustible) working fluid, such as helium or carbon dioxide that can circulate through inlet heat exchanger 16. Intermediate inlet heat exchanger 52 is configured to receive liquid fuel from fuel pump 32 and place the liquid fuel and the working fluid in thermal communication. Inlet heat exchanger 16 is configured to receive the working fluid from intermediate inlet heat exchanger 52 and place the working fluid in thermal communication with the inlet air flow $F_I$, such that thermal energy is transferred indirectly from the inlet air flow $F_I$ to the liquid fuel. As illustrated in FIG. 2, working fluid is circulated between intermediate inlet heat exchanger 52 and inlet heat exchanger 16 via pump 34. Liquid fuel is pumped from tank 40 via fuel pump 34 to intermediate inlet heat exchanger 52, where the fuel serves as a heat sink for working fluid from inlet heat exchanger 16. From intermediate inlet heat exchanger 52, fuel is circulated through exhaust heat exchanger 30, and expanded through fuel turbine 32 before being delivered to combustor 24 or augmentor 29 for combustion in gas turbine engine 12.

With the exception of routing liquid fuel through inlet heat exchanger 16, system 50 can operate in a manner consistent with system 10. As previously disclosed and illustrated in FIG. 2, fuel can be routed through various fuel lines depending on operational mode and operating conditions. It will be understood that the various fuel paths disclosed with respect to system 10 and illustrated in FIG. 1 also apply to system 50 as illustrated in FIG. 2. With the addition of intermediate inlet heat exchanger 52, liquid fuel in system 50 simply bypasses inlet heat exchanger 16 through fuel line E, which fluidly connects intermediate inlet heat exchanger 52 with exhaust heat exchanger 30.

Figure 3:
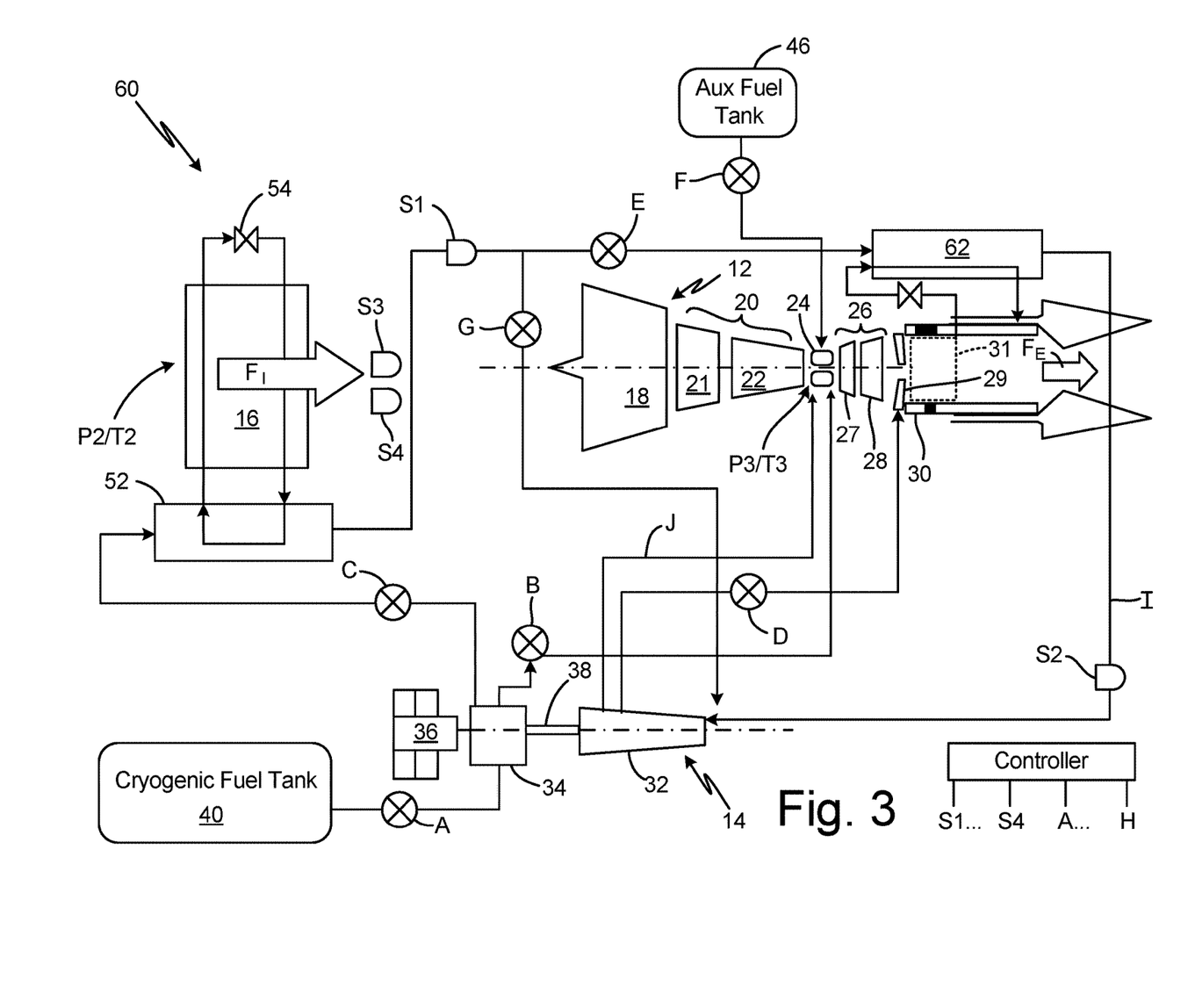
FIG. 3 is yet another embodiment of a gas turbine engine system with pre-compression cooling and a turbo-generator with an expander cycle.

In another alternative embodiment, an additional intermediate exhaust heat exchanger can be used to indirectly transfer heat from exhaust gas to the fuel. FIG. 3 is a schematic diagram of gas turbine engine system 60 including intermediate exhaust heat exchanger 62. Intermediate exhaust heat exchanger 62 is in fluid communication with the fuel from intermediate inlet heat exchanger 52 and exhaust heat exchanger 30. Intermediate exhaust heat exchanger 62 is configured to receive the liquid fuel from intermediate inlet heat exchanger 52 and place the fuel in thermal communication with a separate inert (non-combustible) working fluid, such as helium or carbon dioxide. Exhaust heat exchanger 30 is configured to receive the working fluid from the intermediate exhaust heat exchanger 62 and place the working fluid in thermal communication with the exhaust gas $F_E$, such that thermal energy is transferred indirectly from the exhaust gas to the fuel. As illustrated in FIG. 3, working fluid is circulated between intermediate exhaust heat exchanger 62 and exhaust heat exchanger 30 via pump 64. Fuel is pumped from tank 40 through intermediate inlet heat exchanger 52 and through intermediate exhaust heat exchanger 62. From intermediate exhaust heat exchanger 62, fuel is directed through fuel turbine 32 and to combustor 24 or augmentor 29 for combustion in gas turbine engine 12.

With the exception of routing fuel through exhaust heat exchanger 30, system 60 can operate in a manner consistent with system 50. As previously disclosed and illustrated in FIG. 3, fuel can be routed through various fuel lines depending on operational mode and operating conditions. It will be understood that the various fuel paths disclosed with respect to systems 10 and 50 and illustrated in FIGS. 1 and 2, respectively, also apply to system 60 as illustrated in FIG. 3. With the addition of intermediate exhaust heat exchanger 52, fuel in system 60 simply bypasses exhaust heat exchanger 30 through fuel line J, which fluidly connects intermediate exhaust heat exchanger 62 with fuel turbine 32.

The working fluid used in intermediate inlet heat exchanger 52 is non-flammable fluid capable of removing thermal energy from inlet air and transferring thermal energy to the liquid fuel. The working fluid used in intermediate exhaust heat exchanger 62 can also be a non-flammable fluid and is capable of removing thermal energy from exhaust gas and transferring thermal energy to the fuel. As previously disclosed, working fluid for both intermediate inlet and intermediate exhaust heat exchangers 52, 62 can include helium or carbon dioxide, but is not limited to the fluids disclosed.

The disclosed systems 10, 50, 60 can use plentiful and cleaner burning fuel to enable increases in aircraft maximum speed while controlling effective inlet air temperature T2, allowing continued use of existing fan, compressor, and hot section materials, and generating energy using regenerative (i.e., waste heat) input with reduced impact on turbomachinery sizing, performance, and operability.

Summation

Any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, transient alignment or shape variations induced by thermal, rotational or vibrational operational conditions, and the like.

Moreover, any relative terms or terms of degree used herein should be interpreted to encompass a range that expressly includes the designated quality, characteristic, parameter or value, without variation, as if no qualifying relative term or term of degree were utilized in the given disclosure or recitation.

Discussion of Possible Embodiments

The following are non-exclusive descriptions of possible embodiments of the present invention.

A gas turbine engine system includes a gas turbine engine and a fuel turbine system. The gas turbine engine includes an air inlet, compressor, combustor, turbine, and heat exchange system. The heat exchange system is configured to transfer thermal energy from an inlet air flow or exhaust air flow to a fuel to produce a gaseous fuel that is used to drive a fuel turbine and fuel pump and used for combustion in the gas turbine engine. The fuel turbine is in fluid communication with the heat exchange system and the combustor and configured to extract energy from expansion of the gaseous fuel. The fuel pump is configured to be driven by the fuel turbine and is in fluid communication with the heat exchanger system.

The gas turbine engine system of the preceding paragraph can optionally include, additionally and/or alternatively, any one or more of the following features, configurations, and/or additional components:

A further embodiment of the gas turbine engine system, wherein the heat exchange system can include an inlet heat exchange system configured to transfer thermal energy from the inlet air flow to the fuel.

A further embodiment of the gas turbine engine system of any of the preceding paragraphs, wherein the inlet heat exchange system can include an inlet heat exchanger disposed in the air inlet of the gas turbine engine and in an inlet air flow path, wherein the inlet heat exchanger can be in fluid communication with the fuel pump.

A further embodiment of the gas turbine engine system of any of the preceding paragraphs, wherein the inlet heat exchange system can include an inlet heat exchanger disposed in the air inlet of the gas turbine engine and in an inlet air flow path, and an intermediate inlet heat exchanger disposed external to the inlet air flow path and in fluid communication with the fuel pump and the inlet heat exchanger. The intermediate inlet heat exchanger can be configured to place the fuel and a first working fluid in a thermal communication and wherein the inlet heat exchanger can be configured to receive the first working fluid from the intermediate inlet heat exchanger and place the first working fluid in thermal communication with the inlet air flow, such that thermal energy is transferred indirectly from the inlet air flow to the fuel.

A further embodiment of the gas turbine engine system of any of the preceding paragraphs, wherein the heat exchange system can further include an exhaust heat exchange system in fluid communication with the inlet heat exchange system and configured to transfer thermal energy from the exhaust gas flow to the fuel, wherein the fuel turbine can be in fluid communication with the exhaust heat exchange system.

A further embodiment of the gas turbine engine system of any of the preceding paragraphs, wherein the exhaust heat exchange system can include an exhaust heat exchanger in fluid communication with the inlet heat exchange system.

A further embodiment of the gas turbine engine system of any of the preceding paragraphs, wherein the exhaust heat exchange system can include an exhaust heat exchanger, and an intermediate exhaust heat exchanger in fluid communication with the inlet heat exchange system and the exhaust heat exchanger. The intermediate exhaust heat exchanger can be configured to place the fuel in thermal communication with a second working fluid, and wherein the exhaust heat exchanger can be configured to receive the second working fluid from the intermediate exhaust heat exchanger and place the second working fluid in thermal communication with the exhaust gas, such that thermal energy is transferred indirectly from the exhaust gas to the fuel.

A further embodiment of the gas turbine engine system of any of the preceding paragraphs, wherein the fuel turbine can include multiple stages and is configured to produce the gaseous fuel at the second pressure, wherein the second pressure is greater than a pressure of the compressed air flow.

A further embodiment of the gas turbine engine system of any of the preceding paragraphs, wherein the fuel turbine system can further include a combination motor/generator configured to be driven by the fuel turbine.

A further embodiment of the gas turbine engine system of any of the preceding paragraphs, wherein the fuel pump and combination motor/generator can be mechanically coupled to a rotor shaft of the fuel turbine.

A further embodiment of the gas turbine engine system of any of the preceding paragraphs, wherein the fuel pump can be in fluid communication with a cryogenic fuel.

A method of operating a gas turbine engine system includes cooling an inlet air flow via an inlet heat exchange system by transferring thermal energy to a liquid fuel to produce a cooled inlet air flow. The cooled inlet air flow is compressed to produce a compressed air for combustion. Energy is extracted from expansion of a gaseous fuel through a multi-stage fuel turbine, which produces a gaseous fuel having a pressure greater than a pressure of the compressed air flow. The fuel turbine is fluidly connected to the inlet heat exchange system. A mixture of the gaseous fuel from an outlet of the fuel turbine and compressed air flow is combusted. A pump driven by the fuel turbine pumps liquid fuel to the inlet heat exchange system.

The method of the preceding paragraph can optionally include, additionally and/or alternatively, any one or more of the following features, configurations, additional components, and/or steps:

A further embodiment of the method, wherein the gaseous fuel can be produced by transferring thermal energy to the liquid fuel via the inlet heat exchange system.

A further embodiment of the method of any of the preceding paragraphs can further include heating fuel received from and heated by the inlet heat exchange system via an exhaust heat exchange system to produce the gaseous fuel, wherein the heating process comprises transferring thermal energy from an exhaust gas of the gas turbine engine to the fuel received from the inlet heat exchange system.

A further embodiment of the method of any of the preceding paragraphs can further include pumping the liquid fuel through an inlet heat exchanger of the inlet heat exchange system, wherein the inlet heat exchanger is positioned in a flow path of the inlet air flow.

A further embodiment of the method of any of the preceding paragraphs can further include pumping the liquid fuel through an intermediate inlet heat exchanger in fluid communication with the fuel pump and the inlet heat exchanger, pumping a first working fluid through the inlet heat exchanger and the intermediate inlet heat exchanger, transferring thermal energy from the inlet air flow to the first working fluid, transferring thermal energy from the first working fluid to the liquid fuel.

A further embodiment of the method of any of the preceding paragraphs can further include pumping the fuel received from the intermediate inlet heat exchanger through an intermediate exhaust heat exchanger in fluid communication with the intermediate inlet heat exchanger and the exhaust heat exchanger, pumping a second working fluid through the exhaust heat exchanger and the intermediate exhaust heat exchanger, transferring thermal energy from the exhaust gas to the second working fluid, and transferring thermal energy from the second working fluid to the fuel received from the intermediate inlet heat exchanger.

A further embodiment of the method of any of the preceding paragraphs, wherein the liquid fuel can be cryogenic.

A further embodiment of the method of any of the preceding paragraphs can further include extracting power from the fuel turbine via a combined motor/generator.

A fuel turbine system includes a heat exchange system configured to transfer heat to a liquid fuel to produce a gaseous fuel, a fuel turbine in fluid communication with the heat exchange system and configured to extract energy from expansion of the gaseous fuel, and a fuel pump in fluid communication with the heat exchange system and configured to deliver the liquid fuel to the heat exchange system. The fuel pump is mechanically coupled to the fuel turbine and configured to be driven by the fuel turbine.

The fuel turbine system of the preceding paragraph can optionally include, additionally and/or alternatively, any one or more of the following features, configurations, and/or additional components:

A further embodiment of the fuel turbine system, wherein the heat exchange system can include an inlet heat exchange system of a gas turbine engine with the inlet heat exchange system configured to cool an inlet air flow, and wherein the fuel turbine can be fluidly connected to a combustor of the gas turbine engine and configured to deliver the gaseous fuel to the combustor.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of operating a gas turbine engine system, the method comprising:
   receiving an inlet air flow in an air inlet;
   cooling the inlet air flow via an inlet heat exchange system to produce a cooled inlet air flow, wherein the cooling process comprises transferring thermal energy to a fuel;
   compressing the cooled inlet air flow in a compressor to produce a compressed air flow;
   sensing a temperature and/or a pressure of the fuel exiting the inlet heat exchange system;
   selectively directing the fuel to one of a multi-stage fuel turbine and an exhaust heat exchange system based on the sensed temperature and/or the sensed pressure, wherein the fuel is directed to the multi-stage fuel turbine via a first fuel line connecting the inlet heat exchange system to the multi-stage fuel turbine, the first fuel line having a first valve, and the fuel is directed to the exhaust heat exchange system via a second fuel line connecting the inlet heat exchange system to the exhaust heat exchange system, the second fuel line having a second valve, wherein the exhaust heat exchange system is configured to transfer thermal energy from an exhaust gas of the gas turbine engine to the fuel, and wherein the first fuel line bypasses the exhaust heat exchange system;
   extracting energy from expansion of the fuel received from the one of the inlet heat exchange system and the exhaust heat exchange system through the multi-stage fuel turbine, wherein the fuel is in a gaseous fuel state at a first pressure prior to expansion in the multi-stage fuel turbine and expansion of the gaseous fuel causes the gaseous fuel to have a second pressure less than the first pressure and greater than a pressure of the compressed air flow;
   combusting a mixture of the gaseous fuel from an outlet of the multi-stage fuel turbine and the compressed air flow in a combustor of the gas turbine engine, wherein the combustor is in fluid communication with the multi-stage fuel turbine; and
   pumping the liquid fuel to the inlet heat exchange system via a fuel pump driven by the multi-stage fuel turbine.

2. The method of claim 1, wherein the liquid fuel is cryogenic.

3. The method of claim 1, wherein the exhaust heat exchange system comprises an exhaust heat exchanger and wherein the exhaust gas heats the fuel received from the inlet heat exchange system in the exhaust heat exchanger.

4. The method of claim 1, further comprising pumping the fuel through an inlet heat exchanger of the inlet heat exchange system, wherein the inlet heat exchanger is positioned in a flow path of the inlet air flow.

5. The method of claim 4, further comprising:
   pumping the fuel through an intermediate inlet heat exchanger in fluid communication with the fuel pump and the inlet heat exchanger;
   pumping a first working fluid through the inlet heat exchanger and the intermediate inlet heat exchanger;
   transferring thermal energy from the inlet air flow to the first working fluid; and
   transferring thermal energy from the first working fluid to the fuel.

6. The method of claim 5, further comprising:
   pumping the fuel received from the intermediate inlet heat exchanger through an intermediate exhaust heat exchanger in fluid communication with the intermediate inlet heat exchanger and an exhaust heat exchanger of the exhaust heat exchange system;
   pumping a second working fluid through the exhaust heat exchanger and the intermediate exhaust heat exchanger;
   transferring thermal energy from the exhaust gas to the second working fluid; and
   transferring thermal energy from the second working fluid to the fuel received from the intermediate inlet heat exchanger.

7. The method of claim 1, further comprising supplying power from the multi-stage fuel turbine to a combined motor/generator.

8. A fuel turbine system for a gas turbine engine, the fuel turbine system comprising:
   a heat exchange system configured to transfer heat to a liquid fuel to produce a gaseous fuel, wherein the heat exchange system comprises:

an inlet heat exchange system configured to transfer thermal energy from an inlet air of the gas turbine engine to the liquid fuel;

an exhaust heat exchange system connected to the inlet heat exchange system via a first fuel line with a first valve, the exhaust heat exchange system configured to transfer thermal energy from an exhaust gas of the gas turbine engine to the fuel received from the inlet heat exchange system via the first fuel line; and a second fuel line with a second valve, the second fuel line connecting the inlet heat exchange system to the fuel turbine to supply the fuel exiting the inlet heat exchange system to the fuel turbine for expansion in the fuel turbine, wherein the second fuel line bypasses the exhaust heat exchange system;

a fuel turbine interchangeably in fluid communication with each of the inlet heat exchange system and the exhaust heat exchange system and configured to extract energy from expansion of the fuel received from the inlet heat exchange system and the exhaust heat exchange system, wherein the fuel received from the inlet heat exchange system and the exhaust heat exchange system is in a gaseous state; and a fuel pump in fluid communication with the heat exchange system and configured to deliver the liquid fuel to the heat exchange system, wherein the fuel pump is mechanically coupled to the fuel turbine and configured to be driven by the fuel turbine.

9. The fuel turbine system of claim 8, and further comprising:

a sensor configured to sense a temperature and/or a pressure of fuel exiting the inlet heat exchange system.

10. A gas turbine engine system comprising:

a gas turbine engine comprising:

an air inlet configured to receive an inlet air flow;

a compressor configured to compress the inlet air flow to produce a compressed air flow;

a combustor configured to combust a mixture of the compressed air flow and a gaseous fuel at a first pressure to produce a combustion gas flow;

a turbine configured to extract energy from expansion of the combustion gas flow to produce an exhaust gas flow; and a heat exchange system comprising an inlet heat exchange system and an exhaust heat exchange system, the heat exchange system configured to transfer thermal energy from an air flow to a fuel to produce the gaseous fuel at a second pressure greater than the first pressure, wherein the air flow is selected from the group consisting of the inlet air flow and the exhaust gas flow;

a sensor configured to sense a temperature and/or a pressure of the fuel exiting the inlet heat exchange system; and a fuel turbine system comprising:

a fuel turbine in fluid communication with the heat exchange system and the combustor, wherein the fuel turbine is configured to extract energy from expansion of the gaseous fuel at the second pressure to produce the gaseous fuel at the first pressure; and a fuel pump configured to be driven by the fuel turbine, wherein the fuel pump is in fluid communication with the heat exchanger system;

a first fuel line with a first valve, the first fuel line connecting the inlet heat exchange system to the fuel turbine to drive the fuel turbine, wherein the first fuel line bypasses the exhaust heat exchange system; and a second fuel line with a second valve, the second fuel line connecting the inlet heat exchange system to the exhaust heat exchange system.

11. The gas turbine engine system of claim 10, wherein the inlet heat exchange system is configured to transfer thermal energy from the inlet air flow to the fuel, and wherein the gas turbine engine further comprises an auxiliary inlet configured to cause air to bypass the inlet heat exchange system when the inlet heat exchange system is not in use.

12. The gas turbine engine system of claim 11, wherein the inlet heat exchange system comprises an inlet heat exchanger disposed in the air inlet of the gas turbine engine and in an inlet air flow path, wherein the inlet heat exchanger is in fluid communication with the fuel pump.

13. The gas turbine engine system of claim 11, wherein the inlet heat exchange system comprises:

an inlet heat exchanger disposed in the air inlet of the gas turbine engine and in an inlet air flow path; and an intermediate inlet heat exchanger disposed external to the inlet air flow path and in fluid communication with the fuel pump and the inlet heat exchanger, wherein the intermediate inlet heat exchanger is configured to place the fuel and a first working fluid in a thermal communication and wherein the inlet heat exchanger is configured to receive the first working fluid from the intermediate inlet heat exchanger and place the first working fluid in thermal communication with the inlet air flow, such that thermal energy is transferred indirectly from the inlet air flow to the fuel.

14. The gas turbine engine system of claim 11, wherein the exhaust heat exchange system is configured to transfer thermal energy from the exhaust gas flow to the fuel received from the inlet heat exchange system and wherein the fuel turbine is in fluid communication with the exhaust heat exchange system.

15. The gas turbine engine system of claim 14, wherein the exhaust heat exchange system comprises an exhaust heat exchanger in fluid communication with the inlet heat exchange system.

16. The gas turbine engine system of claim 14, wherein the exhaust heat exchange system comprises:

an exhaust heat exchanger; and an intermediate exhaust heat exchanger in fluid communication with the inlet heat exchange system and the exhaust heat exchanger, wherein the intermediate exhaust heat exchanger is configured to place the fuel in thermal communication with a second working fluid, and wherein the exhaust heat exchanger is configured to receive the second working fluid from the intermediate exhaust heat exchanger and place the second working fluid in thermal communication with the exhaust gas, such that thermal energy is transferred indirectly from the exhaust gas to the fuel.

17. The gas turbine engine system of claim 10, wherein the fuel turbine comprises multiple stages and is configured to produce the gaseous fuel at the second pressure, wherein the first pressure is greater than a pressure of the compressed air flow.

18. The gas turbine engine system of claim 17, wherein the fuel turbine system further comprises a combination motor/generator configured to be driven by the fuel turbine.

19. The gas turbine engine system of claim 18, wherein the fuel pump and combination motor/generator are mechanically coupled to a rotor shaft of the fuel turbine.

20. The gas turbine engine system of claim 10, wherein the fuel pump is in fluid communication with a cryogenic fuel, and wherein the gas turbine engine system further comprises an auxiliary fuel tank configured to deliver an auxiliary supply of gaseous fuel to the combustor during startup.

\* \* \* \* \*